United States Patent
Bittmann et al.

(10) Patent No.: US 11,720,569 B2
(45) Date of Patent: Aug. 8, 2023

(54) DETERMINING THRESHOLD VALUES BASED ON SAMPLED DATA

(71) Applicant: SAP SE, Walldorf (DE)

(72) Inventors: Ran Bittmann, Tel Aviv (IL); Lev Sigal, Karmiel (IL)

(73) Assignee: SAP SE, Walldorf (DE)

( * ) Notice: Subject to any disclaimer, the term of this patent is extended or adjusted under 35 U.S.C. 154(b) by 423 days.

(21) Appl. No.: 16/842,372

(22) Filed: Apr. 7, 2020

(65) Prior Publication Data
US 2021/0311947 A1 Oct. 7, 2021

(51) Int. Cl.
*G06F 16/2455* (2019.01)
*G06F 16/21* (2019.01)

(52) U.S. Cl.
CPC ........ *G06F 16/24553* (2019.01); *G06F 16/21* (2019.01)

(58) Field of Classification Search
None
See application file for complete search history.

(56) References Cited

U.S. PATENT DOCUMENTS

2020/0183946 A1* 6/2020 Pelloin .................... G06F 17/18
2021/0027503 A1* 1/2021 Kumaresan ............. G06F 16/26

* cited by examiner

*Primary Examiner* — Giuseppi Giuliani
(74) *Attorney, Agent, or Firm* — Fountainhead Law Group P.C.

(57) ABSTRACT

Some embodiments provide a program that queries a database for a subset of a plurality of records in the database. Each record in the plurality of records includes a value for a field. The program further samples the subset of the plurality of records to identify a set of records in the subset of the plurality of records. The program also sorts the set of records based on the value for the field in each record in the set of records. The program further determines a first value for the field of a first record in the sorted set of records and a second value for the field of a second record in the sorted set of records forms a slope that is greater than or equal to a defined slope. The program determines a threshold value for the subset of the plurality of records based on the first record.

20 Claims, 7 Drawing Sheets

DETERMINING THRESHOLD VALUES BASED ON SAMPLED DATA

BACKGROUND

In data processing, many different techniques and approaches may be used to analyze sets of data and discover useful information from the sets of data. For example, data cleansing operations can be performed on sets of data in order to identify incorrect or corrupt data and either fix remove the identified data. Data transformation may be performed on sets of data in order to convert the data into a desirable format or structure that is easier or more efficient to work with. As another example, various operations can be performed on the sets of data in order to calculate descriptive statistics that describe or summarize the sets of data. Examples of descriptive statistics include medians, means, modes, standard deviations, variances, etc.

SUMMARY

In some embodiments, a non-transitory machine-readable medium stores a program executable by at least one processing unit of a device. The program queries a database for a subset of a plurality of records in the database. Each record in the plurality of records includes a value for a field. The program further samples the subset of the plurality of records to identify a set of records in the subset of the plurality of records. The program also sorts the set of records based on the value for the field in each record in the set of records. The program further determines a first value for the field of a first record in the sorted set of records and a second value for the field of a second record in the sorted set of records forms a slope that is greater than or equal to a defined slope. The program also determines a threshold value for the subset of the plurality of records based on the first record.

In some embodiments, determining that the first value for the field of the first record and the second value for the field of the second record forms the slope greater than the defined slope may include calculating a gradient value based on the first value for the field of the first record and the second value for the field of the second record and determine that the gradient value is greater than or equal to a defined gradient value. Sorting the set of records based on the value for the field in each record in the set of records may include sorting the set of records from least to greatest based on the value for the field in each record in the set of records.

In some embodiments, the program may further store the threshold value in a storage for later processing of newly received records. The program may further receive from a first client device a third record that includes a third value for the field; determine that the third value for the field of the third record is greater than or equal to the threshold value; and, based on the determination that the third value for the field of the third record is greater than or equal to the threshold value, send a notification to a second client device indicating that the third record is to be reviewed.

In some embodiments, the subset of the plurality of records may be a first subset of the plurality of records, the set of records may be a first set of records, the slope may be a first slope, and the threshold value may be a first threshold value. The program may further query the database for a second subset of the plurality of records in the database; sample the second subset of the plurality of records to identify a second set of records in the second subset of the plurality of records; sort the second set of records based on the value for the field in each record in the second set of records; determine a third value for the field of a third record in the sorted set of records and a fourth value for the field of a fourth record in the sorted set of records forms a second slope that is greater than or equal to the defined slope; and determine a second threshold value for the second subset of the plurality of records based on the third record. A first number of records in the first set of records may be equal to a second number of records in the second set of records.

In some embodiments, a method queries a database for a subset of a plurality of records in the database. Each record in the plurality of records includes a value for a field. The method further samples the subset of the plurality of records to identify a set of records in the subset of the plurality of records. The method also sorts the set of records based on the value for the field in each record in the set of records. The method further determines a first value for the field of a first record in the sorted set of records and a second value for the field of a second record in the sorted set of records forms a slope that is greater than or equal to a defined slope. The method also determines a threshold value for the subset of the plurality of records based on the first record.

In some embodiments, determining that the first value for the field of the first record and the second value for the field of the second record forms the slope greater than the defined slope may include calculating a gradient value based on the first value for the field of the first record and the second value for the field of the second record and determine that the gradient value is greater than or equal to a defined gradient value. Sorting the set of records based on the value for the field in each record in the set of records may include sorting the set of records from least to greatest based on the value for the field in each record in the set of records.

In some embodiments, the method may further store the threshold value in a storage for later processing of newly received records. The method may further receive from a first client device a third record that includes a third value for the field; determine that the third value for the field of the third record is greater than or equal to the threshold value; and, based on the determination that the third value for the field of the third record is greater than or equal to the threshold value, send a notification to a second client device indicating that the third record is to be reviewed.

In some embodiments, the subset of the plurality of records may be a first subset of the plurality of records, the set of records may be a first set of records, the slope may be a first slope, and the threshold value may be a first threshold value. The method may further query the database for a second subset of the plurality of records in the database; sample the second subset of the plurality of records to identify a second set of records in the second subset of the plurality of records; sort the second set of records based on the value for the field in each record in the second set of records; determine a third value for the field of a third record in the sorted set of records and a fourth value for the field of a fourth record in the sorted set of records forms a second slope that is greater than or equal to the defined slope; and determine a second threshold value for the second subset of the plurality of records based on the third record. A first number of records in the first set of records may be equal to a second number of records in the second set of records.

In some embodiments, a system includes a set of processing units and a non-transitory machine-readable medium that stores instructions. The instructions cause the at least one processing unit to query a database for a subset of a plurality of records in the database. Each record in the plurality of records comprising a value for a field. The instructions further cause the at least one processing unit to sample the subset of the plurality of records to identify a set of records in the subset of the plurality of records. The instructions also cause the at least one processing unit to sort the set of records based on the value for the field in each record in the set of records. The instructions further cause the at least one processing unit to determine a first value for the field of a first record in the sorted set of records and a second value for the field of a second record in the sorted set of records forms a slope that is greater than or equal to a defined slope. The instructions also cause the at least one processing unit to determine a threshold value for the subset of the plurality of records based on the first record.

In some embodiments, determining that the first value for the field of the first record and the second value for the field of the second record forms the slope greater than the defined slope may include calculating a gradient value based on the first value for the field of the first record and the second value for the field of the second record and determine that the gradient value is greater than or equal to a defined gradient value. Sorting the set of records based on the value for the field in each record in the set of records may include sorting the set of records from least to greatest based on the value for the field in each record in the set of records.

In some embodiments, the instructions may further cause the at least one processing unit to store the threshold value in a storage for later processing of newly received records. The instructions may further cause the at least one processing unit to receive from a first client device a third record that includes a third value for the field; determine that the third value for the field of the third record is greater than or equal to the threshold value; and, based on the determination that the third value for the field of the third record is greater than or equal to the threshold value, send a notification to a second client device indicating that the third record is to be reviewed.

In some embodiments, the subset of the plurality of records may be a first subset of the plurality of records, the set of records may be a first set of records, the slope may be a first slope, and the threshold value may be a first threshold value. The instructions may further cause the at least one processing unit to query the database for a second subset of the plurality of records in the database; sample the second subset of the plurality of records to identify a second set of records in the second subset of the plurality of records; sort the second set of records based on the value for the field in each record in the second set of records; determine a third value for the field of a third record in the sorted set of records and a fourth value for the field of a fourth record in the sorted set of records forms a second slope that is greater than or equal to the defined slope; and determine a second threshold value for the second subset of the plurality of records based on the third record. A first number of records in the first set of records may be equal to a second number of records in the second set of records.

The following detailed description and accompanying drawings provide a better understanding of the nature and advantages of various embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for determining threshold values based on sampled data. In some embodiments, a computing system may receive data records (also referred to as records) from any number of different client devices and store them in a storage. Each of the received records includes a value for a particular field. The computing system periodically determines threshold values for different subsets of records stored in the storage. To determine a threshold value for a particular subset of records, the computing system queries the storage for the subset of records. Next, the computing system can sample a set of records from the subset of records. Then, the computing system sorts the set of records based on the values for the particular field from least to greatest. The computing system iterates through each pair of successive records (also referred to as adjacent records or neighboring records) in the sorted set of records and calculates the slope formed by the pair of successive records. When the computing system encounters a slope for a particular pair of successive records that is greater than or equal to a defined slope, the computing system determines the value for the particular field of one of the records in the pair to be the threshold value for the subset of records.

The techniques described in the present application provide a number of benefits and advantages over conventional methods of determining threshold values for sets of data. For instance, by sampling the set of data first and then determining a threshold value for the set of data based on the sampled data, the computing system is able to determine threshold values quickly and efficiently since determining threshold values in such a manner is utilizes less processing resources. Moreover, the computing system can employ techniques where only a portion of the sampled data is processed to determine threshold values. This allows the computing system to determine threshold values even faster and more efficient as even less processing resources are utilized with these techniques.

As mentioned above, the techniques described here are used to determine threshold values based on sampled data. There are many applications to which the techniques may be applied. For example, the computing system may be an expense management system that manages and processes expense reports received from client devices. Each expense report includes one or more line items. Each line item can include a number of different fields such as, for example, a date, a vendor name, a location, an expense type, an amount of the expense, etc. In some instances, the particular field of interest is the amount of an expense. The techniques described here can be applied to determine a threshold amount for a given set of line items that have the same type, the same location, the same vendor name, etc. or any combination thereof. The determined threshold amounts may be used to determine whether newly received expense reports have line items that need to be reviewed or manually approved because such line items contain amounts that are identified as unreasonable (e.g., too high).

Figure 1:
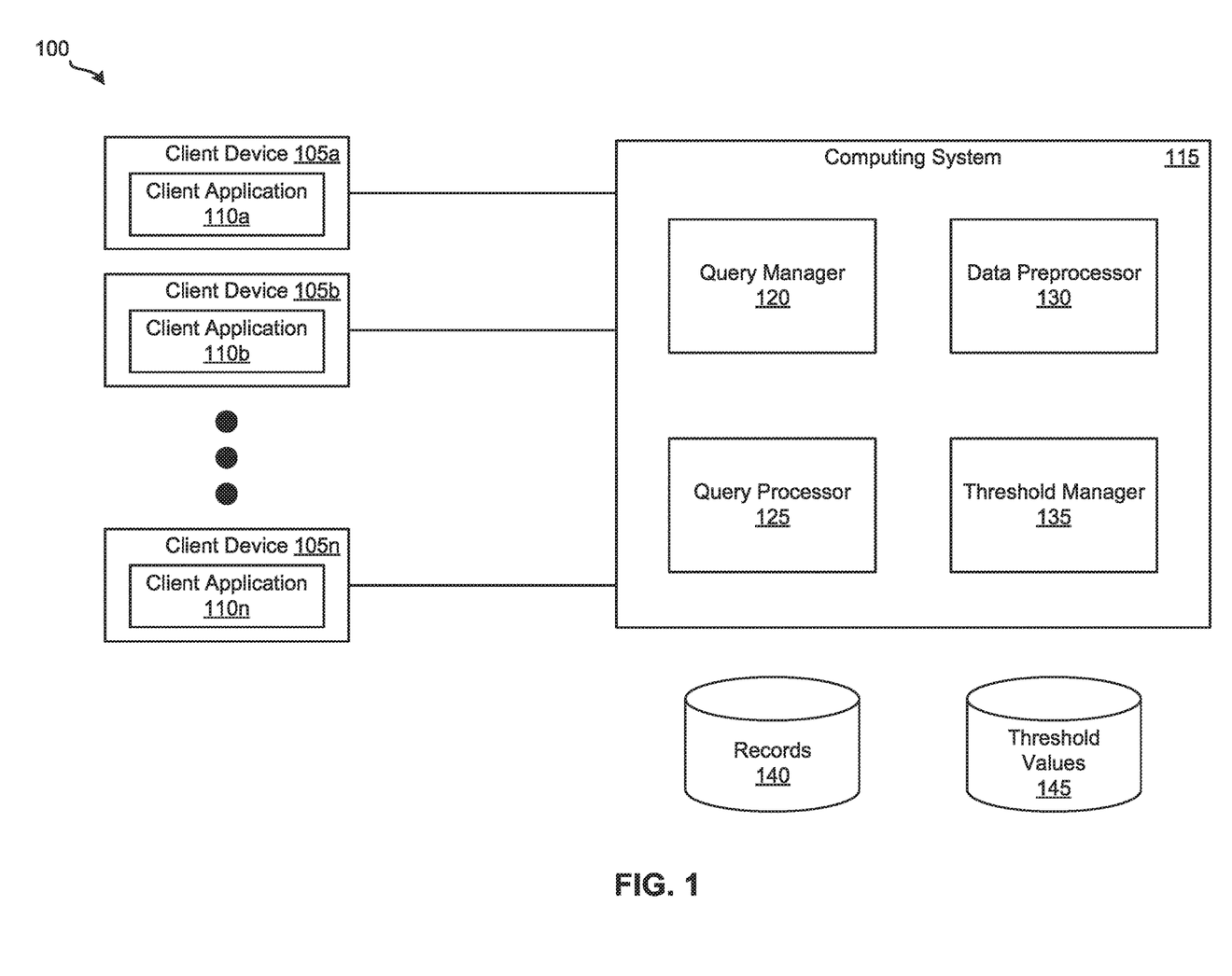
FIG. 1 illustrates a system for determining threshold values based on sampled data according to some embodiments.

FIG. 1 illustrates a system 100 for determining threshold values based on sampled data according to some embodiments. As shown, system 100 includes client devices 105a-n, computing system 115, records storage 140, and threshold values storage 145. Records storage 140 is configured to store records (e.g., line items in expense reports) received from client devices 105a-n. Threshold values storage 145 can store threshold values determined for different subsets of records stored in records storage 140. In some embodiments, storages 140 and 145 are implemented in a single physical storage while, in other embodiments, storages 140 and 145 may be implemented across several physical storages. While FIG. 1 shows storages 140 and 145 as external to computing system 115, one of ordinary skill in the art will appreciate that records storage 140 and/or threshold values storage 145 may be part of computing system 115 in some embodiments.

Client devices 105a-n can be configured to communicate and interact with computing system 115. For example, each client device 100 includes a client application (e.g., a desktop application, a mobile application, a web browser, etc.) operating on the client device 110. A user of a client device 110 may use the client application to access computing system 115 and transmit records to computing system 115. In some embodiments, the records are line items that the user of the client device 110 sends to computing system 115 in the form of expense reports. An expense report can include one or more line items. Each line item in an expense report can include a set of fields. Examples of fields in a line item include a date on which the expense was incurred, a name of a vendor associated with the expense, a location where the expense was incurred, a type of the expense (e.g., meals, lodging, transport, parking, entertainment, etc.), an amount of the expense, etc. A user of a client device 110 can also receive notifications from computing system 115 indicating that one or more records is to be reviewed (e.g., the records have a value for a field that is greater than or equal to a threshold value determined by computing system 115).

Computing system 115 is configured to manage records and determine threshold values for different subsets of records. For instance, computing system 115 may receive records from client devices 105a-n. Upon receiving records from a client device 105, computing system 115 stores them in records storage 140. As mentioned above, in some embodiments, the records received from client devices 105a-n are line items. In some such embodiments, the line items that computing system 115 receives from client devices 105a-n are in the form of expense reports.

As shown in FIG. 1, computing system 115 includes query manager 120, query processor 125, data preprocessor 130, and threshold manager 135. Query manager 120 is configured to manage queries for subsets of records stored in records storage 140. In some embodiments, the queries are predefined queries for a particular subset of records stored in records storage 140. For example, in cases where the records are line items, examples of predefined queries include a query for line items having a meals expense type, a query for line items having a meals expense type that were incurred in San Francisco, Calif., a query for line items having a meals expense type that were incurred in Los Angeles, Calif., a query for line items having a hotel expense type, a query for line items having a hotel expense type that were incurred in Seattle, Wash., a query for line items having a hotel expense type that were incurred in Las Vegas, Nev., etc. One of ordinary skill in the art will realize that query manager 120 can be configured with any number of additional and/or different predefined queries.

At defined intervals (e.g., once per day, once per week, once a month, etc.), query manager 125 sends out for processing queries for different sets of records based on the predefined queries. For example, for each predefined query, query manager 120 generates the query specified by the predefined query and sends it to query processor 125 for further processing. When query manager 120 receives the set of records back from query processor 125, query manager 120 sends the set of records to data preprocessor 130 for further processing.

Query processor 125 handles the processing of queries. For instance, when query processor 125 receives a query from query manager 120, query processor 125 accesses records storage 140 and retrieves a set of records specified by the query. Then, query processor 125 sends the set of records to query manager 125.

Data preprocessor 130 is responsible for performing various preprocessing operations on sets of records. For example, data preprocessor 130 may receive a set of records from query manager 120. In response, data preprocessor 130 samples the set of records to identify a subset of the set of records. In some embodiments, data preprocessor 130 samples the set of records by randomly selecting a defined number (e.g., one hundred, one thousand, two thousand, five thousand, etc.) of samples from the set of records. In some instances, the defined number of samples is used for sampling all the different subsets of records. In other instances, different defined numbers of samples are used for sampling different subsets of records. Then, data preprocessor 130 sorts the sampled subset of records. As an example, in cases where records are line items, data preprocessor 130 sorts the sampled subset of records based on the amount field of each record from least to greatest. That is, the starting end of the sorted subset of records has the lowest value for the amount field and the ending end of the sorted subset of records has the highest value for the amount field.

In some embodiments, data preprocessor 130 can sort the set of records first and then sample the sorted set of records to identify a subset of the set of records. For instance, in some such embodiments, when data preprocessor 130 receives the set of records from query manager 120, data preprocessor 130 sorts the set of records based on the amount field of each record from least to greatest in a similar manner described above. Then, data preprocessor 130 selects a defined number (e.g., one hundred, one thousand, two thousand, five thousand, etc.) of samples from the sorted set of records. In some embodiments, data preprocessor 130 samples the defined number of samples from the sorted set of records by dividing the number of records in the set of records by the defined number of samples and using the quotient as an offset to select records in the sorted set of records. For example, if there are 140,000 records in the set of records and the defined number of samples is 2,000, the quotient is 70 (140,000/2,000). Then, data preprocessor 130 selects the 70th record in the sorted set of records as the first sampled record, the 140th record in the sorted set of records as the second sampled record, the 210th record in the sorted set of records as the third sampled record, and so on and so forth, until data preprocessor 130 selects the 140,000th record in the sorted set of records as the 2,000th sampled record. Once data preprocessor 130 has preprocessed the set of records, data preprocessor 130 sends the processed set of records to threshold manager 135.

Figure 2:
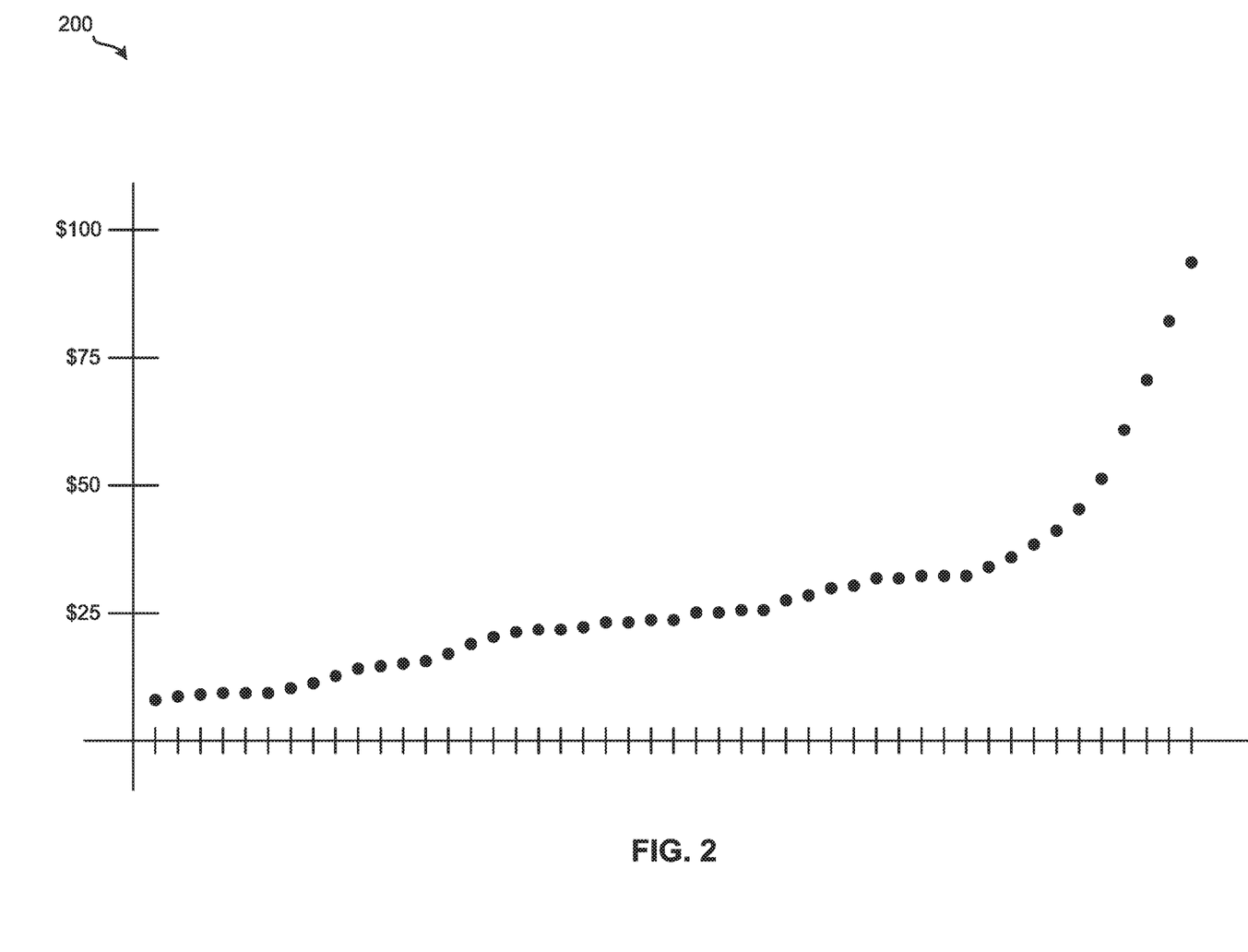
FIG. 2 illustrates an example chart representing sampled and sorted data according to some embodiments.

FIG. 2 illustrates an example chart 200 representing sampled and sorted data according to some embodiments. In this example, the set of records from which the records represented by the points in chart 200 were sampled and sorted is 1,000 line items having a meal expense type that were incurred in San Francisco, Calif. The defined number of samples for this example is 47 samples. As shown in FIG. 2, the range of the values for the amount field in the sampled and sorted set of records is approximately between S9 and S94.

Threshold manager 135 is configured to determine threshold values for sets of records. For instance, upon receiving a set of records (e.g., a set of sampled records that has been sorted based on the amount field) from data preprocessor 130, threshold manager 135 iterates through each pair of successive records in the sorted set of records and calculates the slope formed by the pair of successive records (e.g., based on values for fields in the record). Next, threshold manager 135 determines whether the calculated slope is greater than or equal to a defined slope (e.g., 30 degrees, 45 degrees, 55 degrees, etc.). If the calculated slope is not greater than or equal to the defined slope, threshold manager 135 continues to process pairs of successive records in the set of records. When threshold manager 135 reaches a pair of successive records that has a calculated slope that is greater than or equal to the defined slope, threshold manager 135 uses the value of the amount field of one of the records in the pair of successive records as the threshold value for the set of records.

Threshold manager 135 may use any number of different techniques to determine the slope formed by a pair of successive records. For instance, in some embodiments, threshold manager 135 can calculate a gradient value based on values for a field (e.g., an amount field) of the pair of successive records and determine whether the gradient value is greater than or equal to a defined gradient value. The defined gradient value can correspond to a defined slope. For example, a defined gradient value of 1.73 corresponds to a slope of 30 degrees, a defined gradient value of 1 corresponds to a slope of 45 degrees, a defined gradient value of 0.6 corresponds to a slope of 60 degrees, etc.

Figure 3:
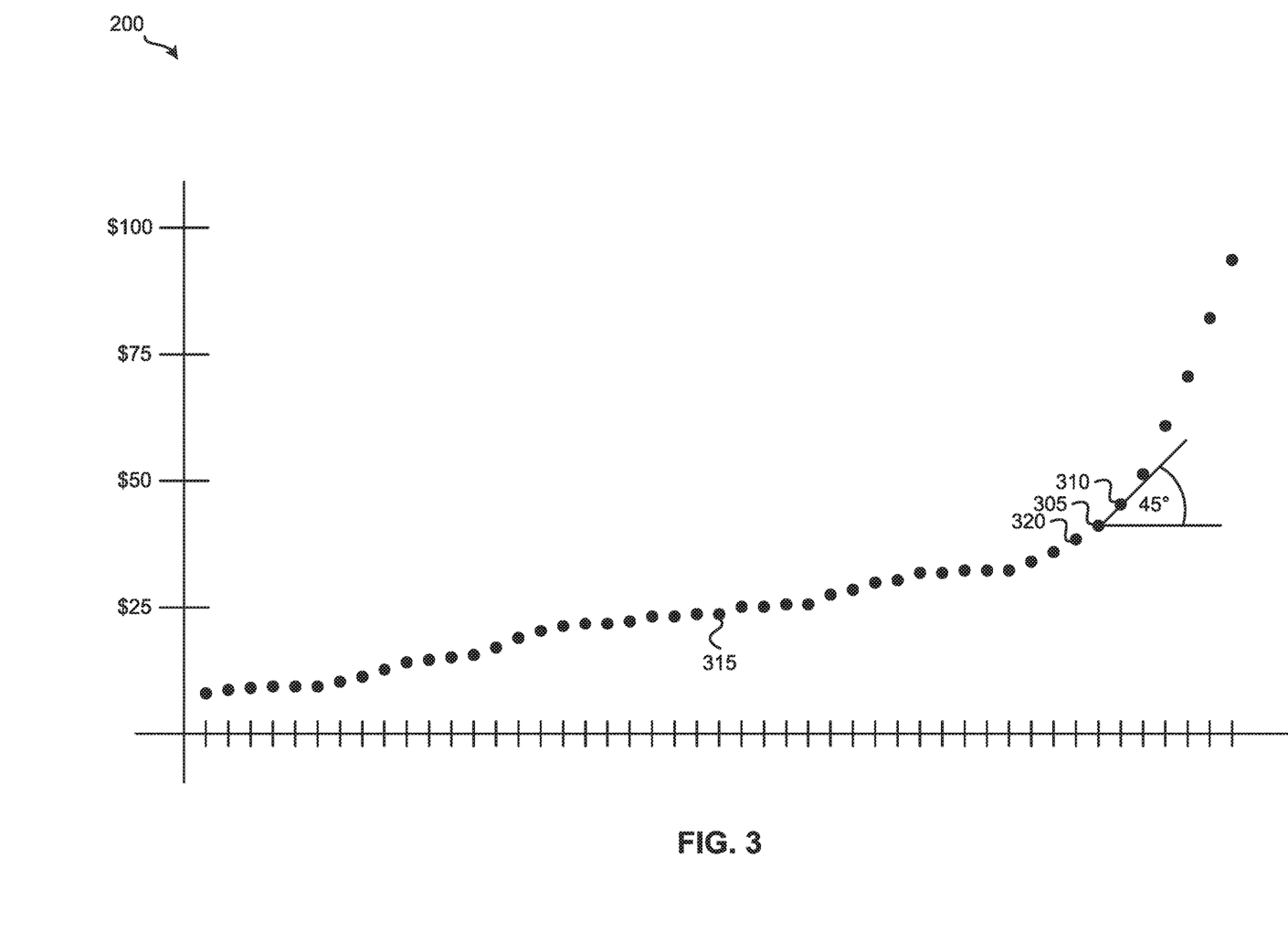
FIG. 3 illustrates a threshold value determined based on the example chart illustrated in FIG. 2 according to some embodiments.

FIG. 3 illustrates a threshold value determined based on the example chart illustrated in FIG. 2 according to some embodiments. For this example, the defined slope that threshold manager 135 uses to determine the threshold value is 45 degrees. To determine the threshold value, threshold manager 135 iterated through each pair of successive records in the sorted set of records and calculates the slope formed by the pair of successive records until a slope formed by a particular pair of successive records is greater than or equal to the defined slope. For instance, threshold manager 135 may start by calculating the slope formed by the leftmost two points in chart 200. Then, threshold manager 135 can calculate the slope formed by the second leftmost two points in chart 200 (i.e., the second and third points starting from the left side of chart 200), the slope formed by the third leftmost two points in chart 200 (i.e., the third and fourth points starting from the left side of chart 200), and so on and so forth until threshold manager 135 reaches the pair of successive records represented by points 305 and 310.

Here, threshold manager 135 calculated that the slope formed by the pair of successive records represented by points 305 and 310 is 45 degrees. Since this slope is the first slope that threshold manager 135 encountered that is greater than or equal to the defined slope, threshold manager 135 determines the value for the amount field of the record represented by point 305 as the threshold value. In this example, the value for the amount field of the record represented by point 305 is approximately S41. As such, threshold manager 135 determines that S41 is the threshold value for line items having a meal expense type that were incurred in San Francisco, Calif.

In some embodiments, threshold manager 135 starts processing pairs of successive records from the beginning of the sorted set of records. Referring to FIG. 3 as an example, threshold manager 135 can start from the left hand side of chart 200. In some embodiments, threshold manager 135 may start at a different starting point. For instance, threshold manager 135 may determine the median record in the sorted set of records and start from the point represented by the median record. Referring to FIG. 3 as an example, threshold manager 135 determines that the record represented by point 315 is the median record in the set of records. As such, threshold manager starts processing the pair of successive records formed by the record represented by point 315 and the record represented by the point to the right of point 315 and continues processing pairs of successive records towards the right of point 315 in a similar fashion described above. As another example, threshold manager 135 can start from the right hand side of chart 200. Then, threshold manager 135 may iterate through and process pairs of successive records towards the left. In some such cases, the slope of the points represented by pairs of successive on the right hand side may be greater than or equal to the defined slope. Thus, when threshold manager 135 encounters the first slope formed by a pair of successive records that is not greater than or equal to (i.e., less than) the defined slope, threshold manager 135 determines the value for the amount field of the record represented by one of the two points (e.g., the left point or the right point) representing the records as the threshold value for the set of data. Referring to FIG. 3 as an example, the first slope that threshold manager 135 encounters that is less than the defined slope is the slope formed by the pair of successive record represented by points 320 and 305. Thus, threshold manager 135 determines the value for the amount field of the record represented by point 305 as the threshold value. In this example chart 200, the two approaches (e.g., starting from the left/middle of chart 200 and iterating right and starting from the right and iterating left) arrive at the same threshold value. In some instances where the two approaches result in two different threshold values, threshold manager 135 may select one of the threshold values or calculate an average of the two threshold values as being the threshold value for the set of data (e.g., line items having a meal expense type that were incurred in San Francisco, Calif. for the example in FIG. 3).

In some embodiments, threshold manager 135 does not calculate slopes formed by pairs of successive records. Rather, in some such embodiments, threshold manager 135 uses an extrapolation technique to determine a function based on the set of records. The function that takes the relative position of a record in sorted set of records as an input and outputs the corresponding value for the amount field of the record. Examples of such functions include a polynomial function. After determining the function, threshold manager 135 determines the derivative of the function. In some embodiments, threshold manager 135 calculates uses inputs values (e.g., the relative position of a record in the sorted set of records) for the derivative function starting from the beginning of the sorted set of records and then calculates the first value that the derivative function outputs above the defined slope. In other embodiments, threshold manager 135 uses input values (e.g., the relative position of a record in the sorted set of records) for the derivative function starting from the median record in the set of records and then calculates the first value that the derivative function outputs above the defined slope. Threshold manager 125 then uses the first value as the input to the determined function and uses the output from the determined function as the determined threshold value for the set of data.

After threshold manager 135 determines a threshold value for a set of data (i.e., a set of data that is the result set of a predefined query), threshold manager 135 stores the threshold value in threshold values storage 145 for later processing. For example, when computing system 115 receives an expense report that includes a line item that belongs to a particular set of data, computing system 115 accesses threshold values storage 145 and retrieves the threshold value determined for the particular set of data and determines, based on the threshold value, whether the line item needs to be reviewed. For example, if the value of the amount field for the line item is greater than or equal to the threshold value, computing system 115 marks the line item for review. In some embodiments, computing system 115 sends a notification to a user (e.g., a user in charge with reviewing and/or approving line items) of a client device 105 indicating that the line item is to be reviewed.

Figure 4:
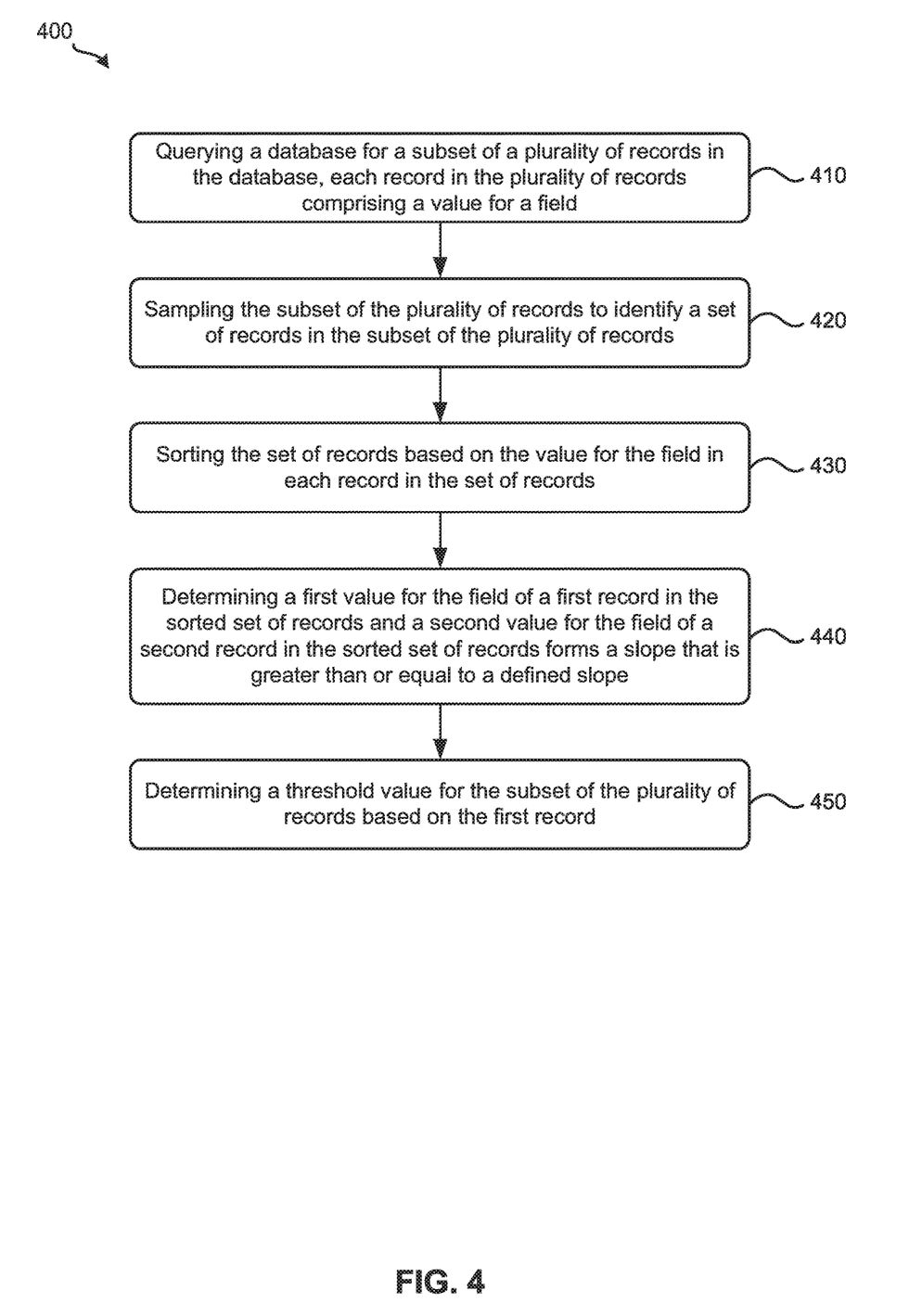
FIG. 4 illustrates a process for determining a threshold values for a sampled set of data according to some embodiments.

FIG. 4 illustrates a process 400 for determining a threshold values for a sampled set of data according to some embodiments. In some embodiments, computing system 115 performs process 400. Process 400 begins by querying, at 410 a database for a subset of a plurality of records in the database, each record in the plurality of records comprising a value for a field. Referring to FIGS. 1 and 2 as an example, query manager 120 may generated a predefined query for line items having a meal expense type that were incurred in San Francisco, Calif. Query manager 120 sends the generated query to query processor 125, which performs operation 410 to retrieve a subset of a plurality of records stored in records storage 140. For this example, the subset of the plurality of records includes line items having a meal expense type that were incurred in San Francisco, Calif.

Next, process 400 samples, at 420, the subset of the plurality of records to identify a set of records in the subset of the plurality of records. Referring to FIGS. 1 and 2 as an example, once data preprocessor 130 receives the subset of the plurality of records from query manager 120, data preprocessor 130 samples the subset of the plurality of records to identify a set of the records. As mentioned above, in some embodiments, data preprocessor 130 may select a defined number of samples from the subset of the plurality of records to be include in the set of records.

Process 400 then sorts, at 430, the set of records based on the value for the field in each record in the set of records. Referring to FIGS. 1 and 2 as an example, data preprocessor 130 sorts the set of records based on the value of the amount field in each of the records in the set of records. In this example, data preprocessor 130 sorts the records in the set of records according to the value of the amount field from least to greatest. As shown in chart 200 of FIG. 2, the set of records (represented by points) are sorted from the lowest value for the amount field to the largest value for the amount field.

After operation 430, process 400 determines, at 440, a first value for the field of a first record in the sorted set of records and a second value for the field of a second record in the sorted set of records forms a slope that is greater than or equal to a defined slope. Referring to FIGS. 1 and 3 as an example, upon receiving the sampled and sorted set of records from data preprocessor 130, threshold manager 135 starts iterating through pairs of successive records in the set of records and calculating slopes formed by the pairs of successive records. FIG. 3 shows threshold manager 135 encountering the first pair of successive records that has a calculated slope that is greater than or equal to the defined slope. These records are represented by points 305 and 310.

Finally, process 400 determines, at 450, a threshold value for the subset of the plurality of records based on the first record. Referring to FIGS. 1 and 3 as an example, when threshold manager 135 reaches the pair of successive records represented by points 305 and 310, which has a calculated slope that is greater than or equal to the defined slope, threshold manager 135 determines that the value of the amount field of one of the records in the pair of successive records as the threshold value for the subset of the plurality of records. For this example, threshold manager 135 determines that the value of the amount field for the record represented by point 305 as the threshold value for the subset of the plurality of records comprised of line items having a meal expense type that were incurred in San Francisco, Calif.

Figure 5:
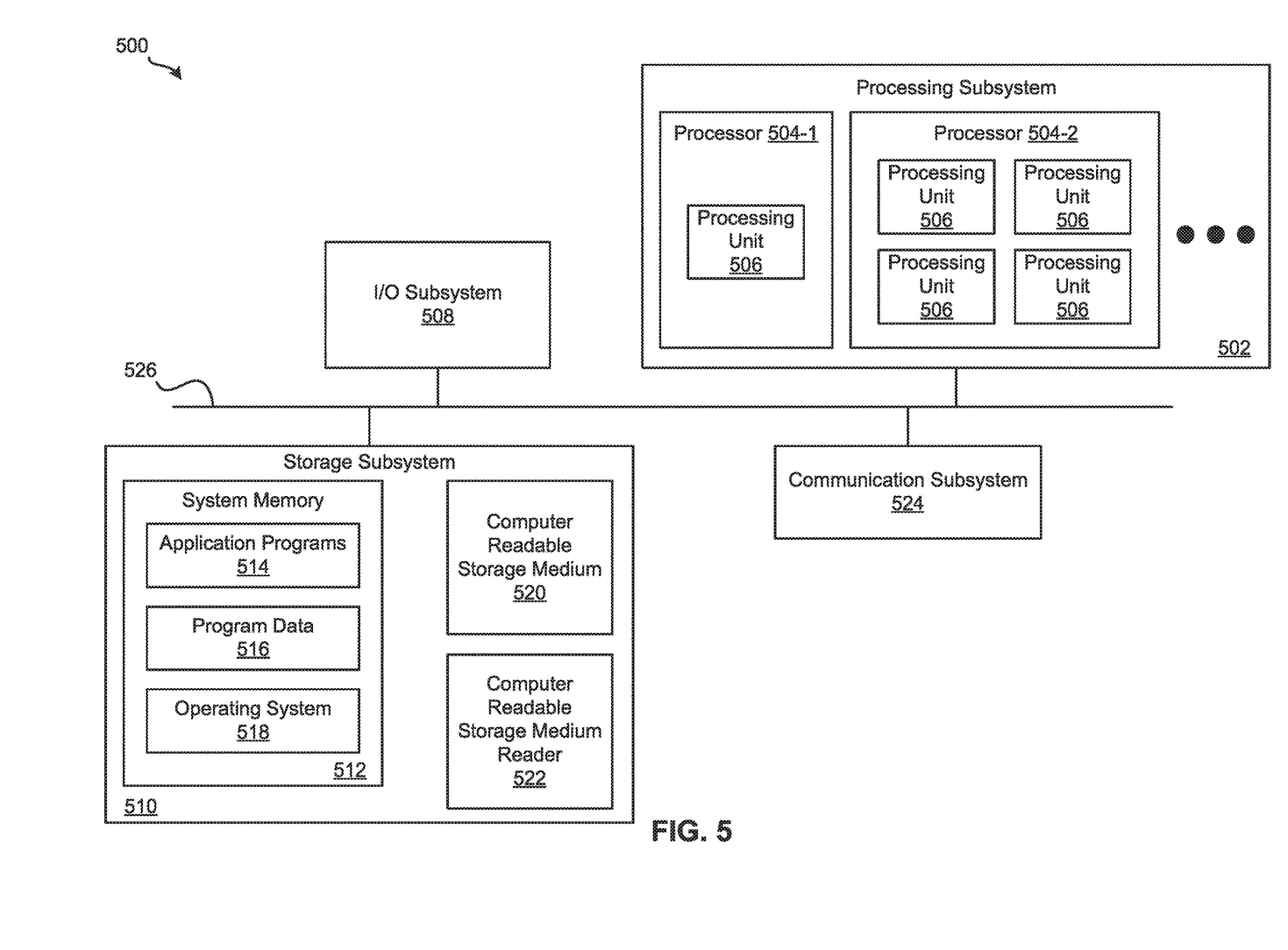
FIG. 5 illustrates an exemplary computer system, in which various embodiments may be implemented.

FIG. 5 illustrates an exemplary computer system 500 for implementing various embodiments described above. For example, computer system 500 may be used to implement systems client devices 105a-n and computing system 115. Computer system 500 may be a desktop computer, a laptop, a server computer, or any other type of computer system or combination thereof. Some or all elements of client applications 110a-n, query manager 120, query processor 125, data preprocessor 130, threshold manager 135, or combinations thereof can be included or implemented in computer system 500. In addition, computer system 500 can implement many of the operations, methods, and/or processes described above (e.g., process 400). As shown in FIG. 5, computer system 500 includes processing subsystem 502, which communicates, via bus subsystem 526, with input/output (I/O) subsystem 508, storage subsystem 510 and communication subsystem 524.

Bus subsystem 526 is configured to facilitate communication among the various components and subsystems of computer system 500. While bus subsystem 526 is illustrated in FIG. 5 as a single bus, one of ordinary skill in the art will understand that bus subsystem 526 may be implemented as multiple buses. Bus subsystem 526 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 502, which can be implemented as one or more integrated circuits (e.g., a conventional microprocessor or microcontroller), controls the operation of computer system 500. Processing subsystem 502 may include one or more processors 504. Each processor 504 may include one processing unit 506 (e.g., a single core processor such as processor 504-1) or several processing units 506 (e.g., a multicore processor such as processor 504-2). In some embodiments, processors 504 of processing subsystem 502 may be implemented as independent processors while, in other embodiments, processors 504 of processing subsystem 502 may be implemented as multiple processors integrate into a single chip or multiple chips. Still, in some embodiments, processors 504 of processing subsystem 502 may be implemented as a combination of independent processors and multiple processors integrated into a single chip or multiple chips.

In some embodiments, processing subsystem 502 can execute a variety of programs or processes in response to program code and can maintain multiple concurrently executing programs or processes. At any given time, some or all of the program code to be executed can reside in processing subsystem 502 and/or in storage subsystem 510. Through suitable programming, processing subsystem 502 can provide various functionalities, such as the functionalities described above by reference to process 400, etc.

I/O subsystem 508 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 500 to a user or another device (e.g., a printer).

As illustrated in FIG. 5, storage subsystem 510 includes system memory 512, computer-readable storage medium 520, and computer-readable storage medium reader 522. System memory 512 may be configured to store software in the form of program instructions that are loadable and executable by processing subsystem 502 as well as data generated during the execution of program instructions. In some embodiments, system memory 512 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 512 may include different types of memory, such as static random access memory (SRAM) and/or dynamic random access memory (DRAM). System memory 512 may include a basic input/output system (BIOS), in some embodiments, that is configured to store basic routines to facilitate transferring information between elements within computer system 500 (e.g., during start-up). Such a BIOS may be stored in ROM (e.g., a ROM chip), flash memory, or any other type of memory that may be configured to store the BIOS.

As shown in FIG. 5, system memory 512 includes application programs 514 (e.g., client application 110*a-n*), program data 516, and operating system (OS) 518. OS 518 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 520 may be a non-transitory computer-readable medium configured to store software (e.g., programs, code modules, data constructs, instructions, etc.). Many of the components (e.g., client applications 110*a-n*, query manager 120, query processor 125, data preprocessor 130, and threshold manager 135) and/or processes (e.g., process 400) described above may be implemented as software that when executed by a processor or processing unit (e.g., a processor or processing unit of processing subsystem 502) performs the operations of such components and/or processes. Storage subsystem 510 may also store data used for, or generated during, the execution of the software.

Storage subsystem 510 may also include computer-readable storage medium reader 522 that is configured to communicate with computer-readable storage medium 520. Together and, optionally, in combination with system memory 512, computer-readable storage medium 520 may comprehensively represent remote, local, fixed, and/or removable storage devices plus storage media for temporarily and/or more permanently containing, storing, transmitting, and retrieving computer-readable information.

Computer-readable storage medium 520 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 524 serves as an interface for receiving data from, and transmitting data to, other devices, computer systems, and networks. For example, communication subsystem 524 may allow computer system 500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 524 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 524 may provide components configured for wired communication (e.g., Ethernet) in addition to or instead of components configured for wireless communication.

One of ordinary skill in the art will realize that the architecture shown in FIG. 5 is only an example architecture of computer system 500, and that computer system 500 may have additional or fewer components than shown, or a different configuration of components. The various components shown in FIG. 5 may be implemented in hardware, software, firmware or any combination thereof, including one or more signal processing and/or application specific integrated circuits.

Figure 6:
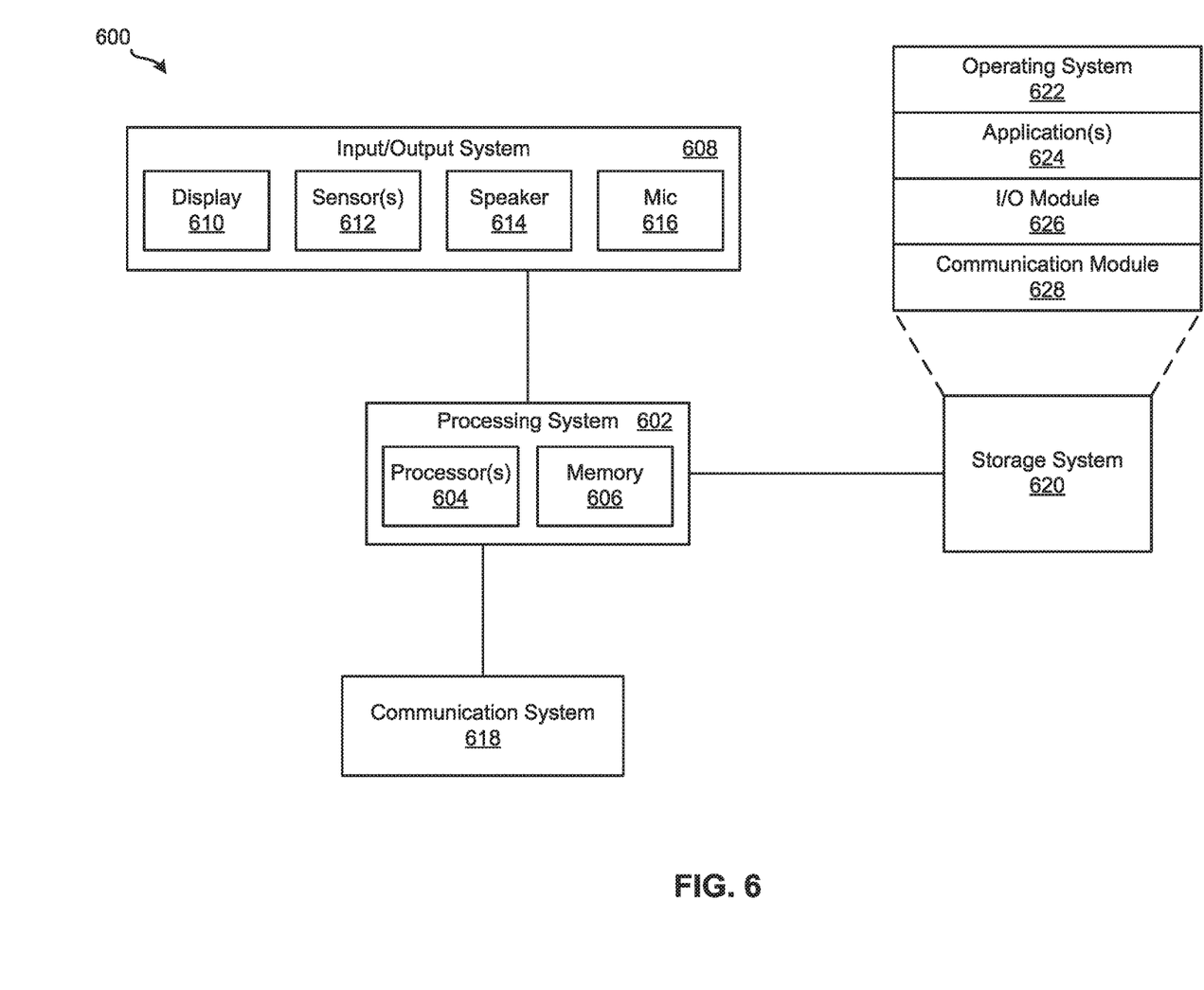
FIG. 6 illustrates an exemplary computing device, in which various embodiments may be implemented.

FIG. 6 illustrates an exemplary computing device 600 for implementing various embodiments described above. For example, computing device 600 may be used to implement devices client devices 105a-n. Computing device 600 may be a cellphone, a smartphone, a wearable device, an activity tracker or manager, a tablet, a personal digital assistant (PDA), a media player, or any other type of mobile computing device or combination thereof. Some or all elements of client applications 60a-n or combinations thereof can be included or implemented in computing device 600. As shown in FIG. 6, computing device 600 includes processing system 602, input/output (I/O) system 608, communication system 618, and storage system 620. These components may be coupled by one or more communication buses or signal lines.

Processing system 602, which can be implemented as one or more integrated circuits (e.g., a conventional microprocessor or microcontroller), controls the operation of computing device 600. As shown, processing system 602 includes one or more processors 604 and memory 606. Processors 604 are configured to run or execute various software and/or sets of instructions stored in memory 606 to perform various functions for computing device 600 and to process data.

Each processor of processors 604 may include one processing unit (e.g., a single core processor) or several processing units (e.g., a multicore processor). In some embodiments, processors 604 of processing system 602 may be implemented as independent processors while, in other embodiments, processors 604 of processing system 602 may be implemented as multiple processors integrate into a single chip. Still, in some embodiments, processors 604 of processing system 602 may be implemented as a combination of independent processors and multiple processors integrated into a single chip.

Memory 606 may be configured to receive and store software (e.g., operating system 622, applications 624, I/O module 626, communication module 628, etc. from storage system 620) in the form of program instructions that are loadable and executable by processors 604 as well as data generated during the execution of program instructions. In some embodiments, memory 606 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 608 is responsible for receiving input through various components and providing output through various components. As shown for this example, I/O system 608 includes display 610, one or more sensors 612, speaker 614, and microphone 616. Display 610 is configured to output visual information (e.g., a graphical user interface (GUI) generated and/or rendered by processors 604). In some embodiments, display 610 is a touch screen that is configured to also receive touch-based input. Display 610 may be implemented using liquid crystal display (LCD) technology, light-emitting diode (LED) technology, organic LED (OLED) technology, organic electro luminescence (OEL) technology, or any other type of display technologies. Sensors 612 may include any number of different types of sensors for measuring a physical quantity (e.g., temperature, force, pressure, acceleration, orientation, light, radiation, etc.). Speaker 614 is configured to output audio information and microphone 616 is configured to receive audio input. One of ordinary skill in the art will appreciate that I/O system 608 may include any number of additional, fewer, and/or different components. For instance, I/O system 608 may include a keypad or keyboard for receiving input, a port for transmitting data, receiving data and/or power, and/or communicating with another device or component, an image capture component for capturing photos and/or videos, etc.

Communication system 618 serves as an interface for receiving data from, and transmitting data to, other devices, computer systems, and networks. For example, communication system 618 may allow computing device 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 618 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 618 may provide components configured for wired communication (e.g., Ethernet) in addition to or instead of components configured for wireless communication.

Storage system 620 handles the storage and management of data for computing device 600. Storage system 620 may be implemented by one or more non-transitory machine-readable mediums that are configured to store software (e.g., programs, code modules, data constructs, instructions, etc.) and store data used for, or generated during, the execution of the software. Many of the components (e.g., client applications 60a-n) described above may be implemented as software that when executed by a processor or processing unit (e.g., processors 604 of processing system 602) performs the operations of such components and/or processes.

In this example, storage system 620 includes operating system 622, one or more applications 624, I/O module 626, and communication module 628. Operating system 622 includes various procedures, sets of instructions, software components and/or drivers for controlling and managing general system tasks (e.g., memory management, storage device control, power management, etc.) and facilitates communication between various hardware and software components. Operating system 622 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 624 can include any number of different applications installed on computing device 600. For example, client applications 60a-n may be installed on computing device 600. Other examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 626 manages information received via input components (e.g., display 610, sensors 612, and microphone 616) and information to be outputted via output components (e.g., display 610 and speaker 614). Communication module 628 facilitates communication with other devices via communication system 618 and includes various software components for handling data received from communication system 618.

One of ordinary skill in the art will realize that the architecture shown in FIG. 6 is only an example architecture of computing device 600, and that computing device 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
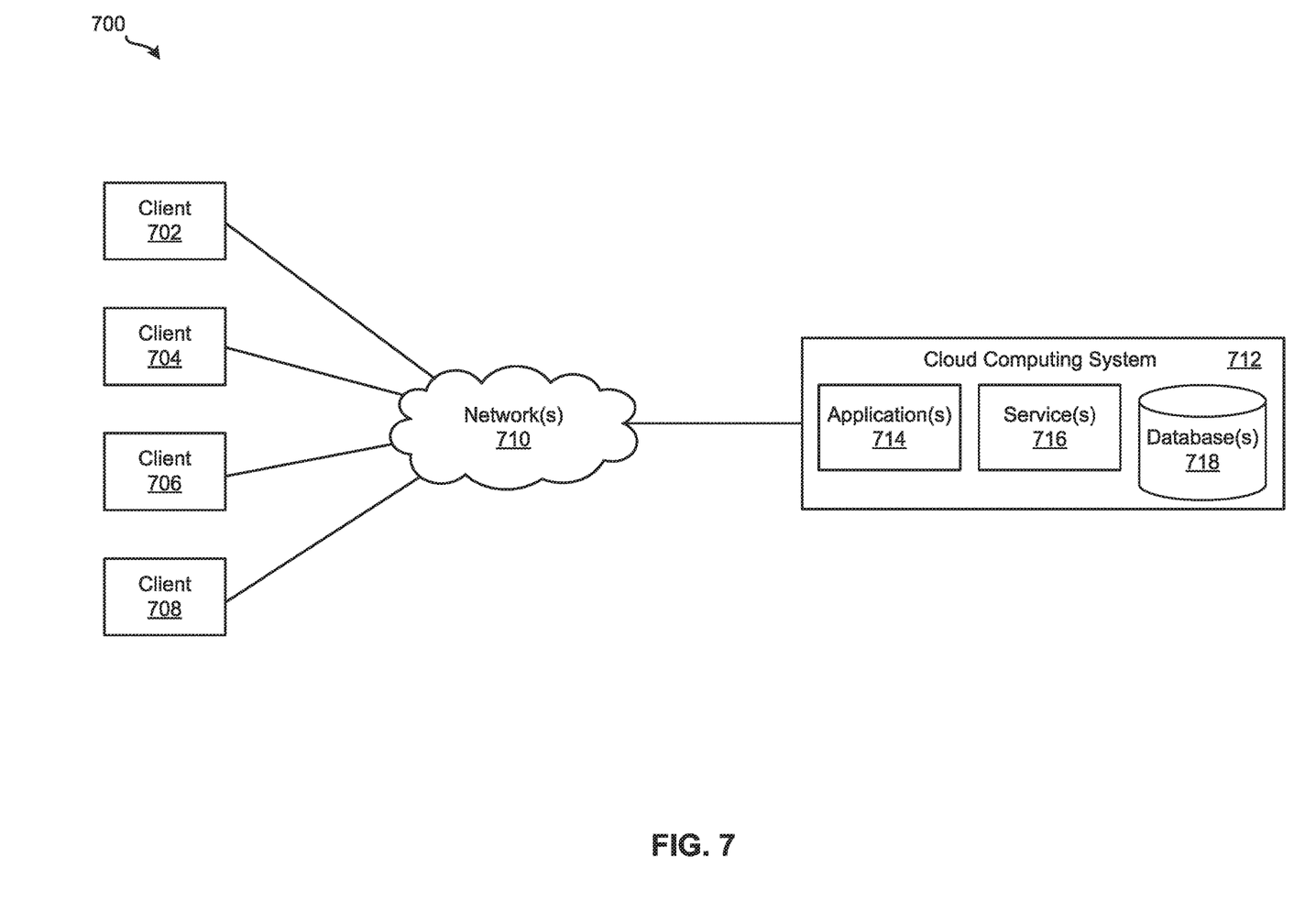
FIG. 7 illustrates an exemplary system, in which various embodiments may be implemented.

FIG. 7 illustrates an exemplary system 700 for implementing various embodiments described above. For example, cloud computing system 612 may be used to implement computing system 115 and client devices 702-708 may be used to implement client devices 105a-n. As shown, system 700 includes client devices 702-708, one or more networks 710, and cloud computing system 712. Cloud computing system 712 is configured to provide resources and data to client devices 702-708 via networks 710. In some embodiments, cloud computing system 700 provides resources to any number of different users (e.g., customers, tenants, organizations, etc.). Cloud computing system 712 may be implemented by one or more computer systems (e.g., servers), virtual machines operating on a computer system, or a combination thereof.

As shown, cloud computing system 712 includes one or more applications 714, one or more services 716, and one or more databases 718. Cloud computing system 700 may provide applications 714, services 716, and databases 718 to any number of different customers in a self-service, subscription-based, elastically scalable, reliable, highly available, and secure manner.

In some embodiments, cloud computing system 700 may be adapted to automatically provision, manage, and track a customer's subscriptions to services offered by cloud computing system 700. Cloud computing system 700 may provide cloud services via different deployment models. For example, cloud services may be provided under a public cloud model in which cloud computing system 700 is owned by an organization selling cloud services and the cloud services are made available to the general public or different industry enterprises. As another example, cloud services may be provided under a private cloud model in which cloud computing system 700 is operated solely for a single organization and may provide cloud services for one or more entities within the organization. The cloud services may also be provided under a community cloud model in which cloud computing system 700 and the cloud services provided by cloud computing system 700 are shared by several organizations in a related community. The cloud services may also be provided under a hybrid cloud model, which is a combination of two or more of the aforementioned different models.

In some instances, any one of applications 714, services 716, and databases 718 made available to client devices 702-708 via networks 710 from cloud computing system 700 is referred to as a "cloud service." Typically, servers and systems that make up cloud computing system 700 are different from the on-premises servers and systems of a customer. For example, cloud computing system 700 may host an application and a user of one of client devices 702-708 may order and use the application via networks 710.

Applications 714 may include software applications that are configured to execute on cloud computing system 712 (e.g., a computer system or a virtual machine operating on a computer system) and be accessed, controlled, managed, etc. via client devices 702-708. In some embodiments, applications 714 may include server applications and/or mid-tier applications (e.g., HTTP (hypertext transport protocol) server applications, FTP (file transfer protocol) server applications, CGI (common gateway interface) server applications, JAVA server applications, etc.). Services 716 are software components, modules, application, etc. that are configured to execute on cloud computing system 712 and provide functionalities to client devices 702-708 via networks 710. Services 716 may be web-based services or on-demand cloud services.

Databases 718 are configured to store and/or manage data that is accessed by applications 714, services 716, and/or client devices 702-708. For instance, storages 140 and 145 may be stored in databases 718. Databases 718 may reside on a non-transitory storage medium local to (and/or resident in) cloud computing system 712, in a storage-area network (SAN), on a non-transitory storage medium local located remotely from cloud computing system 712. In some embodiments, databases 718 may include relational databases that are managed by a relational database management system (RDBMS). Databases 718 may be a column-oriented databases, row-oriented databases, or a combination thereof. In some embodiments, some or all of databases 718 are in-memory databases. That is, in some such embodiments, data for databases 718 are stored and managed in memory (e.g., random access memory (RAM)).

Client devices 702-708 are configured to execute and operate a client application (e.g., a web browser, a proprietary client application, etc.) that communicates with applications 714, services 716, and/or databases 718 via networks 710. This way, client devices 702-708 may access the various functionalities provided by applications 714, services 716, and databases 718 while applications 714, services 716, and databases 718 are operating (e.g., hosted) on cloud computing system 700. Client devices 702-708 may be computer system 500 or computing device 600, as described above by reference to FIGS. 5 and 6, respectively. Although system 700 is shown with four client devices, any number of client devices may be supported.

Networks 710 may be any type of network configured to facilitate data communications among client devices 702-708 and cloud computing system 712 using any of a variety of network protocols. Networks 710 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
    querying a database for a subset of a plurality of records in the database, each record in the plurality of records comprising a value for a field;
    sampling the subset of the plurality of records to identify a set of records in the subset of the plurality of records;
    sorting the set of records based on the value for the field in each record in the set of records;
    calculating a slope formed by a first value of the field of a first record in the sorted set of records and a second value of the field of a second record in the sorted set of records;
    determining that the slope is greater than or equal to a defined slope; and
    determining a threshold value for the subset of the plurality of records based on the first record.

2. The non-transitory machine-readable medium of claim 1, wherein determining that the first value of the field of the first record and the second value of the field of the second record forms the slope greater than the defined slope comprises:
    calculating a gradient value based on the first value of the field of the first record and the second value of the field of the second record; and
    determine that the gradient value is greater than or equal to a defined gradient value.

3. The non-transitory machine-readable medium of claim 1, wherein sorting the set of records based on the value for the field in each record in the set of records comprises sorting the set of records from least to greatest based on the value for the field in each record in the set of records.

4. The non-transitory machine-readable medium of claim 1, wherein the program further comprises a set of instructions for storing the threshold value in a storage for later processing of newly received records.

5. The non-transitory machine-readable medium of claim 1, wherein the program further comprises sets of instructions for:
    receiving from a first client device a third record comprising a third value for the field;
    determining that the third value for the field of the third record is greater than or equal to the threshold value; and
    based on the determination that the third value for the field of the third record is greater than or equal to the threshold value, sending a notification to a second client device indicating that the third record is to be reviewed.

6. The non-transitory machine-readable medium of claim 1, wherein the subset of the plurality of records is a first subset of the plurality of records, wherein the set of records is a first set of records, wherein the slope is a first slope, wherein the threshold value is a first threshold value, wherein the program further comprises sets of instructions for:
    querying the database for a second subset of the plurality of records in the database;
    sampling the second subset of the plurality of records to identify a second set of records in the second subset of the plurality of records;
    sorting the second set of records based on the value for the field in each record in the second set of records;
    determining a third value for the field of a third record in the sorted set of records and a fourth value for the field of a fourth record in the sorted set of records forms a second slope that is greater than or equal to the defined slope; and
    determining a second threshold value for the second subset of the plurality of records based on the third record.

7. The non-transitory machine-readable medium of claim 6, wherein a first number of records in the first set of records is equal to a second number of records in the second set of records.

8. A method comprising:
    querying a database for a subset of a plurality of records in the database, each record in the plurality of records comprising a value for a field;
    sampling the subset of the plurality of records to identify a set of records in the subset of the plurality of records;
    sorting the set of records based on the value for the field in each record in the set of records;
    calculating a slope formed by a first value of the field of a first record in the sorted set of records and a second value of the field of a second record in the sorted set of records;
    determining that the slope is greater than or equal to a defined slope; and
    determining a threshold value for the subset of the plurality of records based on the first record.

9. The method of claim 8, wherein determining that the first value of the field of the first record and the second value of the field of the second record forms the slope greater than the defined slope comprises:
    calculating a gradient value based on the first value of the field of the first record and the second value of the field of the second record; and
    determine that the gradient value is greater than or equal to a defined gradient value.

10. The method of claim 8, wherein sorting the set of records based on the value for the field in each record in the set of records comprises sorting the set of records from least to greatest based on the value for the field in each record in the set of records.

11. The method of claim 8 further comprising storing the threshold value in a storage for later processing of newly received records.

12. The method of claim 8 further comprising:
    receiving from a first client device a third record comprising a third value for the field;
    determining that the third value for the field of the third record is greater than or equal to the threshold value; and
    based on the determination that the third value for the field of the third record is greater than or equal to the threshold value, sending a notification to a second client device indicating that the third record is to be reviewed.

13. The method of claim 8, wherein the subset of the plurality of records is a first subset of the plurality of records, wherein the set of records is a first set of records, wherein the slope is a first slope, wherein the threshold value is a first threshold value, wherein the method further comprises:
  querying the database for a second subset of the plurality of records in the database;
  sampling the second subset of the plurality of records to identify a second set of records in the second subset of the plurality of records;
  sorting the second set of records based on the value for the field in each record in the second set of records;
  determining a third value for the field of a third record in the sorted set of records and a fourth value for the field of a fourth record in the sorted set of records forms a second slope that is greater than or equal to the defined slope; and
  determining a second threshold value for the second subset of the plurality of records based on the third record.

14. The method of claim 13, wherein a first number of records in the first set of records is equal to a second number of records in the second set of records.

15. A system comprising:
  a set of processing units; and
  a non-transitory machine-readable medium storing instructions that when executed by at least one processing unit in the set of processing units cause the at least one processing unit to:
  query a database for a subset of a plurality of records in the database, each record in the plurality of records comprising a value for a field;
  sample the subset of the plurality of records to identify a set of records in the subset of the plurality of records;
  sort the set of records based on the value for the field in each record in the set of records;
  calculate a slope formed by a first value of the field of a first record in the sorted set of records and a second value of the field of a second record in the sorted set of records;
  determine that the slope is greater than or equal to a defined slope; and
  determine a threshold value for the subset of the plurality of records based on the first record.

16. The system of claim 15, wherein determining that the first value of the field of the first record and the second value of the field of the second record forms the slope greater than the defined slope comprises:
  calculating a gradient value based on the first value of the field of the first record and the second value of the field of the second record; and
  determine that the gradient value is greater than or equal to a defined gradient value.

17. The system of claim 15, wherein sorting the set of records based on the value for the field in each record in the set of records comprises sorting the set of records from least to greatest based on the value for the field in each record in the set of records.

18. The system of claim 15, wherein the instructions further cause the at least one processing unit to store the threshold value in a storage for later processing of newly received records.

19. The system of claim 15, wherein the instructions further cause the at least one processing unit to:
  receive from a first client device a third record comprising a third value for the field;
  determine that the third value for the field of the third record is greater than or equal to the threshold value; and
  based on the determination that the third value for the field of the third record is greater than or equal to the threshold value, send a notification to a second client device indicating that the third record is to be reviewed.

20. The system of claim 15, wherein the subset of the plurality of records is a first subset of the plurality of records, wherein the set of records is a first set of records, wherein the slope is a first slope, wherein the threshold value is a first threshold value, wherein the instructions further cause the at least one processing unit to:
  query the database for a second subset of the plurality of records in the database;
  sample the second subset of the plurality of records to identify a second set of records in the second subset of the plurality of records;
  sort the second set of records based on the value for the field in each record in the second set of records;
  determine a third value for the field of a third record in the sorted set of records and a fourth value for the field of a fourth record in the sorted set of records forms a second slope that is greater than or equal to the defined slope; and
  determine a second threshold value for the second subset of the plurality of records based on the third record,
  wherein a first number of records in the first set of records is equal to a second number of records in the second set of records.

* * * * *